United States Patent
Feng

(10) Patent No.: US 6,952,293 B2
(45) Date of Patent: Oct. 4, 2005

(54) DOCUMENT BACKING SURFACE FOR SHOW-THROUGH AND ARTIFACT REDUCTION

(75) Inventor: Xiao-fan Feng, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 783 days.

(21) Appl. No.: 09/944,657

(22) Filed: Aug. 31, 2001

(65) Prior Publication Data

US 2003/0053155 A1 Mar. 20, 2003

(51) Int. Cl.$^7$ ............................. H04N 1/04; H04N 1/38
(52) U.S. Cl. ..................... 358/497; 358/474; 358/475; 358/463; 358/464
(58) Field of Search ............................. 358/474, 497, 358/494, 461, 488, 486, 465, 466, 475, 509, 487, 506, 463, 464, 505; 382/274, 312, 318, 319, 275; 399/211, 379, 380; 250/234, 235, 559.42

(56) References Cited

U.S. PATENT DOCUMENTS

| | | | | |
|---|---|---|---|---|
| 4,714,940 A | * | 12/1987 | Inoue et al. ................... 399/6 |
| 5,053,818 A | | 10/1991 | Smith .......................... 399/41 |
| 5,646,744 A | | 7/1997 | Knox .......................... 358/401 |
| 5,790,211 A | * | 8/1998 | Seachman et al. ............. 349/3 |
| 5,832,137 A | | 11/1998 | Knox .......................... 382/275 |
| 5,987,270 A | | 11/1999 | Hulan et al. ................... 399/45 |
| 6,078,051 A | | 6/2000 | Banton et al. ................. 358/463 |
| 6,101,283 A | | 8/2000 | Knox .......................... 382/254 |
| 6,122,393 A | | 9/2000 | Schweid et al. .............. 382/112 |
| 6,166,394 A | | 12/2000 | Rubscha ................... 250/559.42 |
| 6,219,158 B1 | * | 4/2001 | Dawe .......................... 358/509 |
| 6,288,798 B1 | * | 9/2001 | Sharma ........................ 358/448 |
| 6,587,233 B1 | * | 7/2003 | Salgado ....................... 358/505 |
| 6,744,536 B2 | * | 6/2004 | Buchar et al. ............... 358/464 |
| 6,862,117 B1 | * | 3/2005 | Ford et al. ................... 358/475 |

OTHER PUBLICATIONS

Sharma, Gaurav, "Cancellation of Show–Through in Duplex Scanning," Dig. Imaging Tech. Ctr. Xerox Corp., 4 pages.
Unknown Textbook, Chapter 41: Illumination and Color, pp. 644–658.
Unknown Textbook, Sub–Chapter 37–5: The Laws of Reflection and Refraction, pp. 585–587.

* cited by examiner

Primary Examiner—Cheukfan Lee
(74) Attorney, Agent, or Firm—Law Office of Karen Dana Oster

(57) ABSTRACT

A document-backing surface for reducing show-through when a duplex-printed document is scanned but without producing undesirable artifacts. The document-backing surface has a plurality of first and second light-absorbing surfaces, and a plurality of specularly reflective surfaces partially covering each of the second light-absorbing surfaces. The first specularly reflective surfaces are oriented to reflect light from a scanner lamp to a scanner sensor. In an alternate embodiment, the document-backing surface is partially covered by a specularly reflective surface oriented to reflect light from the scanner lamp to the scanner lens. In another embodiment, the document-backing surface has a set of teeth, each of which has light-absorptive first and second tooth surfaces and a specularly reflective surface partially covering each second tooth surface. In addition, the present invention is directed to a method for using a document-backing surface.

27 Claims, 14 Drawing Sheets

DOCUMENT BACKING SURFACE FOR SHOW-THROUGH AND ARTIFACT REDUCTION

BACKGROUND OF INVENTION

The present invention relates to document scanning and specifically to an apparatus that reduces show-through when a duplex-printed document (printed on both sides) is scanned but without producing undesirable artifacts such as black hole or black border.

Various scanning technologies are used in document scanners, copiers, and facsimile machines (collectively, "document-scanning systems") to convert documents into a digital image for copying, document distribution, or archiving. (Throughout this application, the term "document" means any material that may be scanned, such as paper, vellum, plastic, cardboard, photographs, or similar materials.) Generally, a scanner lamp illuminates a document, and a scanner sensor detects the reflection at a single point (such as a pixel) in the document. Scanning technologies measure the relative brightness (ranging from black to white) of each pixel reflection. The detected brightness is converted into an analog signal that typically is subsequently converted into a digital signal. The term "digital count" refers to the measure of brightness of the reflection, where (for example) zero is least bright (black) and 255 is brightest (white). In this exemplary scheme, if the pixel is black, a minimal amount of light is reflected onto the scanner sensor (digital count=0). On the other hand, if the pixel is white, a maximum amount of light is reflected onto the scanner sensor for a digital count of 255.

Before scanning a document, a cover or backing (referred to generally throughout this application as a "document-backing surface") is generally placed behind the document. It's well understood that the color of the document-backing surface is critical to the quality of scanned images. A document-backing surface may be white. With a duplex-printed document, however, the use of a white document-backing surface can create an inaccurate scanned image because the printing from the back side "shows through" and is visible in the scanned image. As an example, FIG. 1 shows a scanned image of a white document that has a kanji character printed on the back side. In the example shown, the area with back-side printing 20 has a reflectance that is about 5% (15 digital counts) lower than the area without back-side printing 22. As FIG. 1 illustrates, a difference of only 15 digital counts is large enough to perceptibly distort a scanned image. FIG. 1 also illustrates that show-through is undesirable. In some copiers, show-through is so severe that background-removal parameters must be adjusted to remove it. But parameter adjustment causes some highlight color loss in copying map originals. In addition, show-through can cause image-processing algorithms to fail. For example, a text region with show-through can easily be missegmented as a photo region due to reduced contrast.

To appreciate the show-through phenomenon, it is helpful to explain the path that light takes to reach a scanner sensor in a document-scanning system. FIG. 2 shows a schematic of an exemplary document-scanning system 24. In this document-scanning system 24, a document 28 on a platen glass 25 is illuminated by a scanner lamp 26 with incident light rays ($I_0$) (shown as a single light ray). Reflected light is collected by a scanner lens 30 and focused on a scanner sensor 32. In the shown document-scanning system 24, document 28 is a sheet of white paper with back-side printing 36 and front-side printing 38. In FIG. 2, the scanner sensor 32 detects a reflection from an area of document 28 that has neither back-side nor front-side printing 36, 38. There are two main components of reflected light that reach the scanner sensor 32. The first component is first-reflected light rays ($I_1$), which are created when incident light rays ($I_0$) are scattered off document 28. The second component, as shown in FIG. 3, is second-transmitted light rays ($I_4$). If document 28 is not opaque (a white-paper document is not opaque), part of the incident light rays ($I_0$) pass through document 28 as first-transmitted light ray ($I_2$) and are reflected off the document-backing surface 34, creating second-reflected light ray ($I_3$). Part of second-reflected light ray ($I_3$) is then retransmitted through document 28 as second-transmitted light rays ($I_4$). The two components of reflected light, first-reflected light rays ($I_1$) and second-transmitted light rays ($I_4$), are collected by the scanner lens 30 and focused on the scanner sensor 32.

If an area of document 28 does not have back-side printing 36, second-transmitted light rays ($I_4$) reach the scanner sensor 32 without creating show-through. If, however, the back side of document 28 contains back-side printing 36, as shown in FIG. 4, a portion of first-transmitted light ray ($I'_2$) and second-reflected light ray ($I'_3$) will be absorbed by the back-side printing 36. This absorption reduces the intensity of second-transmitted light rays ($I'_4$). Show-through results when low-intensity second-transmitted light rays ($I'_4$) are contrasted with the relatively bright second-transmitted light rays ($I_4$) from areas without back-side printing 36.

The manner in which light reaches a scanner sensor 32 in a document-scanning system 24 may be expressed mathematically. The reflectance $R_p$ detected by the scanner sensor 32 when scanning the front-side of paper document 28 is given by:

$$R_p = (T_f^2(x,y))(S_p + T_p^2 R_{bk} T_b^2(x,y)) \qquad \text{Equation (1)}$$

where $T_f$ is the transmittance of the front-side printing 38, x and y denote the coordinate position of the scanned pixel, $S_p$ is the fraction of light scattered by document 28 in the forward direction, $T_p$ is the transmittance of document 28, $R_{bk}$ is the coefficient of reflection of document-backing surface 34, and $T_b$ is the transmittance of back-side printing 36. In an area of a document 28 with back-side printing 36, the reflectance $R_p$ depends on front-side printed pattern transmittance $T_f$ and the back-side printed pattern transmittance $T_b$. This dependence on the printed pattern transmittance terms ($T_f$ and $T_b$) is the cause of show-through in document scanning.

To assist the reader in understanding the present invention, it is helpful to provide an expression for the quantity of light (radiant flux Φ) collected by a scanner lens 30 in the exemplary document-scanning system 24 shown in FIG. 2. Irradiance (E) is given by the following expression:

$$E_1 = \frac{L_0 r_0 \cos(\theta) \pi}{r_1} \qquad \text{Equation (2)}$$

As shown in FIG. 2, $r_0$ denotes the radius of the scanner lamp 26 with radiance of $L_0$ (watts per steradian per meter-squared). The distance from the scanner lamp 26 to the pixel scanned is $r_1$. The scanner lamp 26 illuminates the scanned pixel in document 28 at an angle of θ degrees from the optical axis 84 of the scanner sensor 32. Light with irradiance $E_1$ is reflected by document 28 with a coefficient of reflectance $R_p$. If it is assumed that document 28 is a Lambertian diffuse reflector, light reflected by document 28 has a radiance $L_1$ given by:

$$L_1 = \frac{E_1 R_p}{\pi}. \qquad \text{Equation (3)}$$

The radiant flux collected by scanner lens 30 from the reflection off document 28 is:

$$\Phi_1 = L_1 dA d\Omega = \frac{L_0 R_p \cos(\theta) r_0}{r_1} dA \frac{\pi D^2}{4 r_2^2} \qquad \text{Equation (4)}$$
$$= \frac{L_0 R_p \cos(\theta) r_0 \pi D^2 dA}{4 r_1 r_2^2}$$

In Equation (4), the distance from the scanned pixel to scanner lens 30 is $r_2$ (shown in FIG. 2) and D is the diameter of the scanner lens 30 (not shown). The area of the scanner sensor element 32, projected onto the paper document 28 is dA (also called the instant-field-of-view or "IFOV").

Equation (4) is an expression for the radiant flux reflected from a document 28. In addition, it is helpful to have an expression for the radiant flux reflected from a specularly reflective surface 40. FIG. 5 shows a schematic of an exemplary configuration 41 in which a lamp 27 (of radiance $L_0$) illuminates a specularly reflective surface 40. The radiant flux focused on a sensor 33 by a lens 31 (of diameter D) from the reflection off specularly reflective surface 40 is:

$$\Phi_2 = L_0 dA d\Omega = L_0 R_m dA \frac{\pi D^2}{4 r_2^2} = \frac{\pi L_0 R_m D^2 dA}{4 r_2^2} \qquad \text{Equation (5)}$$

where $R_m$ is the coefficient of reflectivity of the specularly reflective surface 40 and is very close to 1 (100%), and dA is the IFOV of sensor 33.

Turning now to the known techniques for improving the quality of scanned images, several prior art references are reviewed.

U.S. Pat. No. 6,101,283 to Knox, U.S. Pat. No. 5,832,137 to Knox, and U.S. Pat. No. 5,646,744 to Knox ("the Knox references") disclose an image-processing method for show-through suppression. The scanned back-side image of a document is used to create a representation of the show-through contribution to the front-side image. The representation is then used to suppress the show-through in the front-side image. One drawback of the Knox references is that both sides of a document must be scanned. This requires an additional scanner (if both sides are scanned simultaneously) or additional processing steps (to flip the document and scan its back-side). A problem with a duplex scanning approach is that it is too costly to be practical. Moreover, the image-processing algorithms are complex. In addition, front- and back-side scanned images must be aligned. If dual scanners are not employed, human guidance may be required to align the scanned images.

Show-through can be substantially reduced if the document-backing surface is black. Referring to the above expression (Equation (1)) for the reflectance ($R_p$) of a paper document 28, if the document-backing surface is black (i.e., $R_{bk} \rightarrow 0$), the reflection is reduced to near zero, and only the reflection ($S_p$) off the front side of the document 28 is seen by the scanner sensor 32.

U.S. Pat. No. 5,053,818 to Smith ("the Smith reference") takes advantage of this property by placing a black sheet of backing paper behind the document being scanned. Specifically, the Smith reference discloses a method for (1) detecting thin original documents (i.e., documents with potential show-through risk), (2) automatically printing a black page (or feeding a black page from a tray of black paper) and placing it between the thin original document and the document-backing surface, and (3) adjusting the copy lightness setting to eliminate the uniformly gray background. The Smith reference, however, suffers from all the problems (described below) that are inherent in the use of a black background.

FIG. 6 shows an example of a scanned image 86 that results from scanning a document 28 against a black background. As FIG. 6 shows, if the document 28 is smaller than the defined area to be scanned, an undesired black border 42 is produced in the scanned image. Similarly, if holes 43a, tears 43b, dog-ears 43c, or other defects are part of a document 28, these defects show up as undesired black areas in the scanned image. Black border 42, holes 43a, tears 43b, dog-ears 43c, or other defects are collectively referred to herein as "artifacts" 44.

Prior art solutions directed to removal of artifacts include U.S. Pat. No. 6,078,051 to Banton ("the Banton reference") and U.S. Pat. No. 6,122,393 to Schweid et al. ("the Schweid reference"). The Banton and Schweid references are related references that disclose a document-backing surface with a pattern that generates a distinct reflection when scanned. In addition, a means for estimating whether a particular reflection is from the document being scanned or the document-backing surface is disclosed. The requirement for an estimating means increases the cost and complexity of the disclosed apparatus. Further, the algorithm used in the estimating means is susceptible to failure which can cause false corrections, e.g., human eyes may be detected as holes and removed from the image.

Another prior art solution directed to artifact removal is U.S. Pat. No. 5,987,270 to Hulan et al. ("the Hulan reference"), which discloses a copier that scans a defined field of view and searches the scanned image for reference markings and operational components visible on the underside of an automatic document-feeder cover. If a reference marking, operational feature, or shadow is found, it is suppressed in the document image. Further, reference markings are used to determine the size of the document to be copied, and all images scanned outside the document size are suppressed. One disadvantage of the Hulan reference is that it does not address the problem of show-through. Another drawback is that holes, tears, and dog-ears may show up as black artifacts. An additional limitation is that a means for identifying reference markings and operational components is required. This increases the cost and complexity of the disclosed apparatus.

U.S. Pat. No. 6,166,394 to Rubscha ("the Rubscha reference") is yet another example of a prior art solution directed to artifact removal. The Rubscha reference discloses a scanning system in which a document is moved past a sensor. The imaging of undesired document apertures or openings is eliminated by mechanically moving either the image-sensing unit or a backing baffle so as to provide alternately a white or black background. At start-up, a black background is provided for sheet-edge detection. For scanning, a white background is provided. Because a white background is used for scanning, duplex documents scanned using the Rubscha reference may suffer from show-through. A further disadvantage of the Rubscha reference is that it relies on moving parts, which are susceptible to mechanical breakdown.

BRIEF SUMMARY OF THE INVENTION

The present invention relates to document scanning, and specifically to an apparatus that reduces show-through when a duplex-printed document is scanned but without producing undesirable artifacts.

In particular, the present invention is a document-scanning system with a scanner lamp, a scanner sensor, and a scanner cover. The scanner cover has a document-backing surface, i.e., a surface against which a document is placed for scanning. The document-backing surface has a plurality of first and second light-absorbing surfaces. In addition, the document-backing surface has a plurality of first specularly reflective surfaces partially covering each of the second light-absorbing surfaces. The first specularly reflective surfaces are oriented to reflect light from the scanner lamp to the scanner sensor. When the scanner lamp shines on a document placed in front of the document-backing surface, the scanner sensor sees the document-backing surface as if it were black. When the scanner lamp shines directly on the document-backing surface, the scanner sensor sees the document-backing surface as if it were a white-paper document.

In one embodiment, the document-backing surface of the present invention is partially covered by a specularly reflective surface oriented to reflect light from the scanner lamp to the scanner lens.

In another embodiment, the document-backing surface of the present invention has a set of teeth. Each tooth has light-absorptive first and second tooth surfaces. In addition, a specularly reflective surface partially covers each second tooth surface.

In addition, the present invention is directed to a method for using a document-backing surface.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
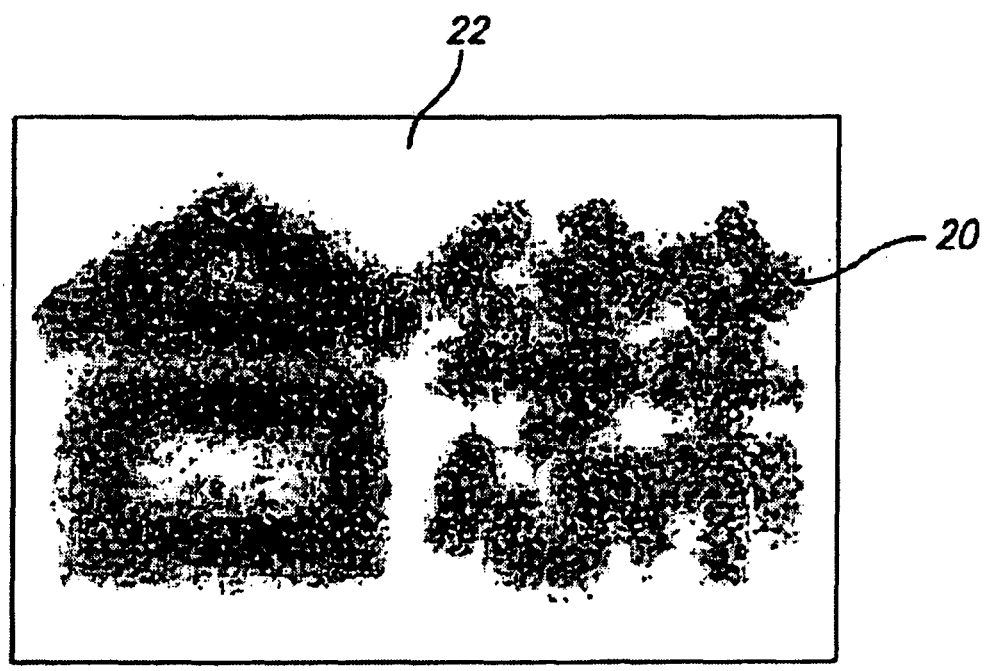
FIG. 1 is a front view of a scanned image of a white document that has a kanji character printed on the back side.
Figure 2:
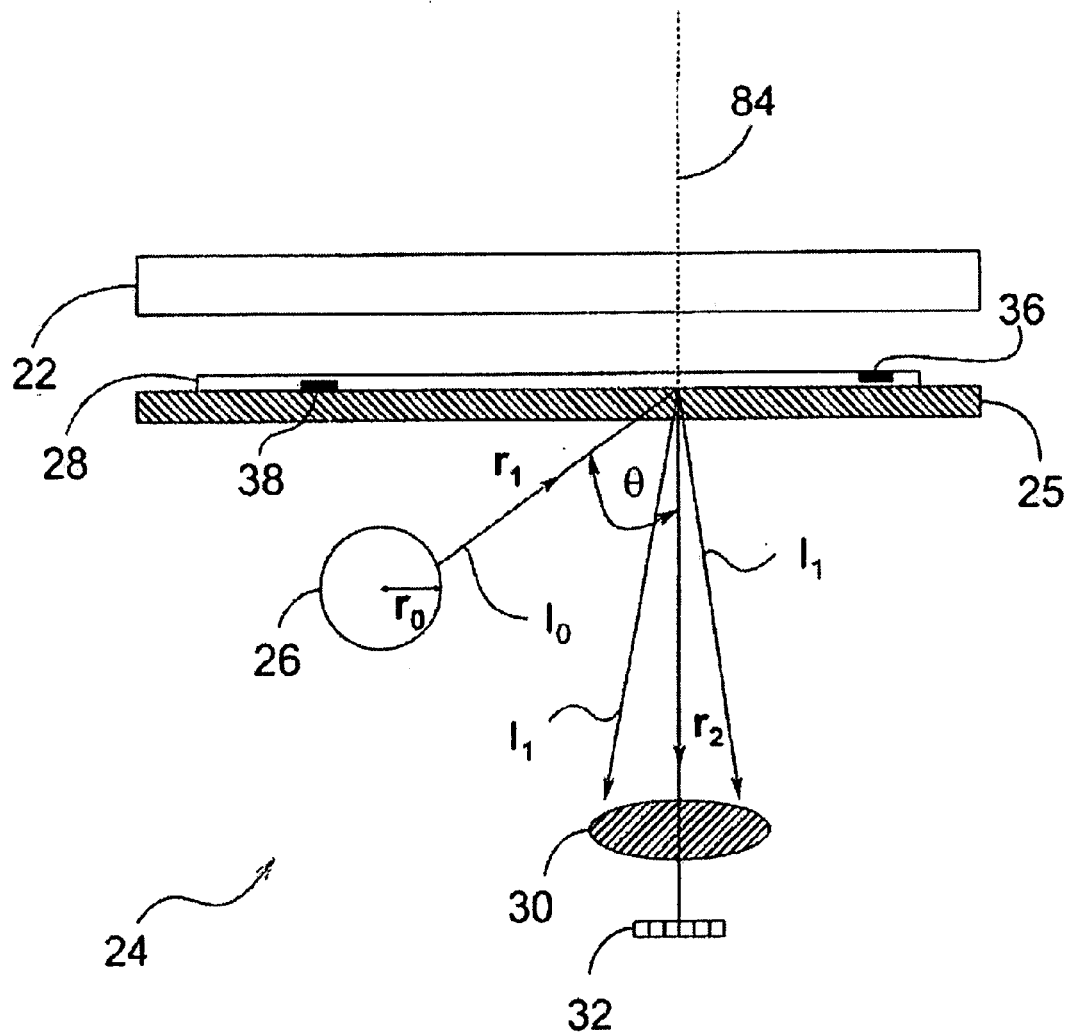
FIG. 2 is a cross-sectional view of a document-scanning system illustrating light being reflected off a document.

The present invention is directed to a scanner cover with a document-backing surface 34 for use in a document-scanning system 24 that reduces show-through when duplex-printed documents 28 are scanned but without producing undesirable artifacts 44. Specifically, as shown in FIGS. 7–11, the document-backing surface 34 of the present invention is a surface against which a document 28 is placed for scanning, which a scanner sensor 32 sees as light-absorbing when a paper document 28 is interposed between the scanner lamp 26 and the document-backing surface 34 and which the scanner sensor 32 sees as light-reflecting when the scanner lamp 26 shines directly on the document-backing surface 34. In one preferred embodiment, the document-backing surface 34 comprises a plurality of surfaces that may have a plurality of shapes, sizes, and orientations. In an alternative preferred embodiment, the document-backing surface 34 is a reflective surface having a predefined coefficient of reflectivity. In an additional preferred embodiment, the document-backing surface 34 comprises both a plurality of surfaces in a plurality of shapes, sizes, and orientations, and a reflective surface at least partially covering at least one of the surfaces.

Figure 7:
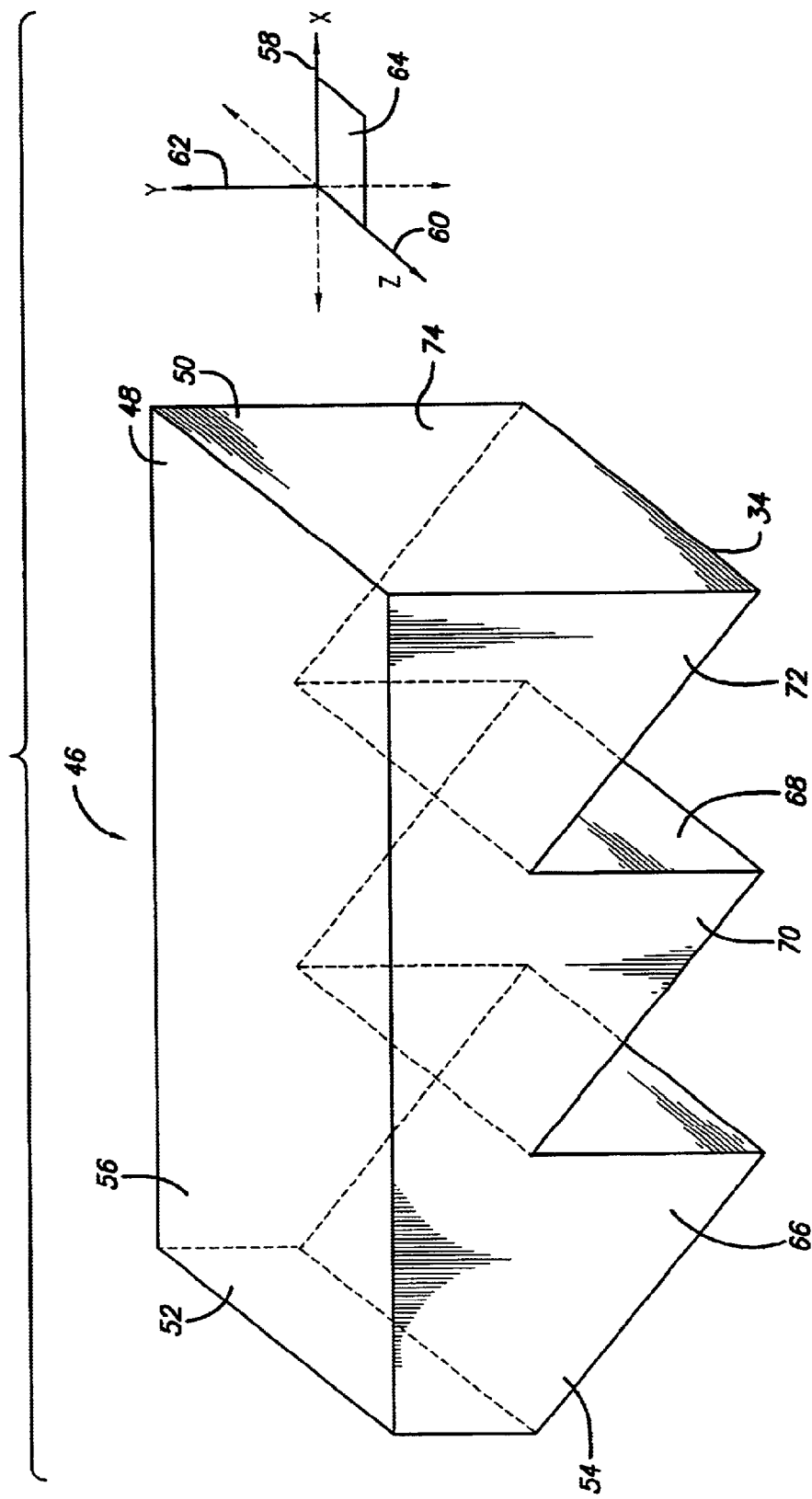
FIG. 7 is a three-dimensional perspective view of one exemplary embodiment of a document-scanner cover with a plurality of teeth of the present invention.

For the purpose of clarity, the terms used to describe the document-scanning cover 46 in this application are defined in relation to FIG. 7. Specifically, the document-scanning cover 46 has a document-backing surface 34 (the bottom of the cover 46 against which a document 28 is placed) and an opposite surface 48 (the top of scanning cover 46). In addition, the document-scanning cover 46 has a first cover end 50, a second cover end 52, a first cover side 54, and a second cover side 56. The cover ends and sides can be thought of as the four edges of the document-scanning cover 46. A longitudinal cover axis (x) 58 is an imaginary line running between the first cover end 50 and the second cover end 52. A latitudinal cover axis (z) 60 is an imaginary line running between the first cover side 54 and the second cover side 56. A vertical cover axis (y) 62 is an imaginary line running between the document-backing surface 34 and the opposite surface 48. A cover geometric plane 64 is defined by any two points on the longitudinal cover axis 58 and any one point on the latitudinal axis 60.

As shown in FIG. 7, the document-backing surface 34 in one preferred embodiment has a sawtooth shape with a plurality of teeth 66, each tooth 66 having a first tooth surface 68, a second tooth surface 70, a first tooth side 72, and a second tooth side 74. In the shown embodiment, each first tooth surface 68 is perpendicular to the geometric cover plane 64, and each second tooth surface 70 is at an acute angle to the geometric cover plane 64. Additionally, in the shown embodiment, each of the plurality of first tooth surfaces 68 are parallel to each other, and each of the plurality of second tooth surfaces 70 are parallel to each other. Moreover, in the shown embodiment each first tooth side 72 is parallel to each second tooth side 74.

As discussed above, FIG. 7 shows one preferred exemplary embodiment of a document-scanning cover 46. In alternative exemplary embodiments, first tooth surface 68 may be at an angle greater or less than 90 degrees to geometric cover plane 64. In additional exemplary embodiments, the plurality of first tooth surfaces 68 may not be parallel to each other, or the plurality of second tooth surfaces 70 may not be parallel to each other, or both the plurality of first tooth surfaces 68 may not be parallel to each other, and the plurality of second tooth surfaces 70 may not be parallel to each other. In yet another alternative embodiment, each first tooth side is not parallel to each second tooth side. For example, in one such alternative embodiment, the document-backing surface 34 is divided into four quadrants for use with four spatially separate scanner sensors 32. Within each quadrant, there is a plurality of second tooth surfaces 70. Each second tooth surface 70 within a quadrant is parallel to the other second tooth surfaces 70 within the same quadrant (and is oriented to reflect light to one of the four scanner sensors 32 associated with the quadrant) but is not parallel to the second tooth surfaces 70 in the other quadrants. In another embodiment, the second tooth surfaces 70 are parallel to the cover geometric plane 64. In other embodiments, the document-backing surfaces 34 are covered with nonpilanar surfaces, such as dimples, ripples, grooves, rounded ridges, or mounds. For example, in one exemplary embodiment the document-backing surface 34 is covered with a plurality of dimples.

Figure 8:
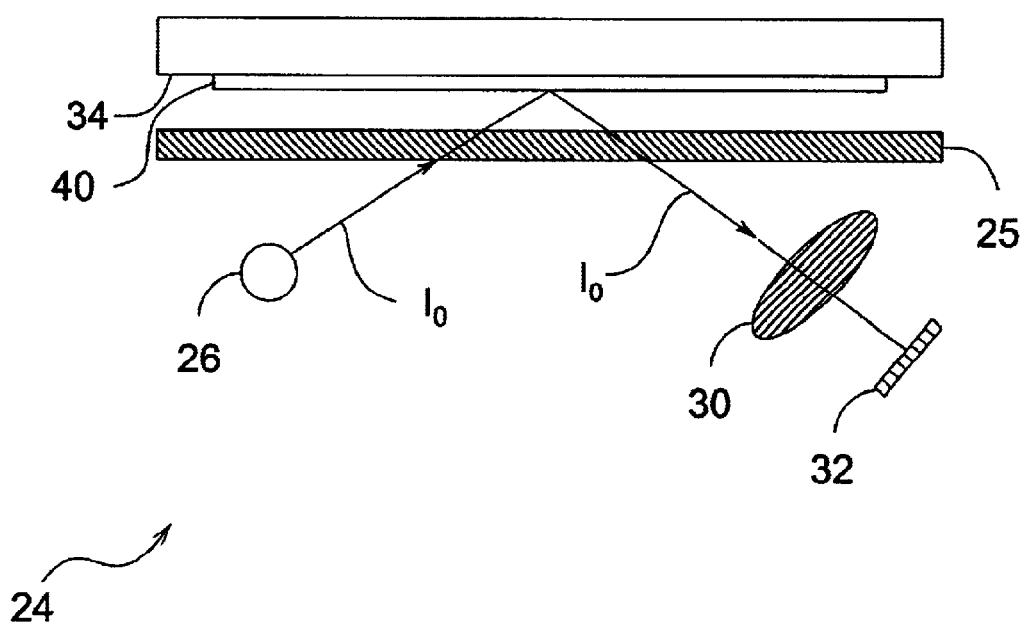
FIG. 8 is a cross-sectional view of one exemplary embodiment of a document-backing surface covered with a specularly reflective surface of the present invention.

As shown in FIG. 8, in one preferred embodiment, the document-backing surface 34 is covered with a specularly reflective surface 40. The reflectivity of specularly reflective surface 40 is variable, and the degree of reflectivity is represented by a coefficient of reflectivity, ranging from 0 percent to 100 percent. In one preferred embodiment, the coefficient of reflectivity is approximately the same as the coefficient of reflectivity of white paper. In an additional preferred embodiment, the coefficient of reflectivity is approximately the same as the coefficient of reflectivity of a specularly reflective surface, such as a mirror. In another preferred embodiment, the coefficient of reflectivity is approximately the same as the coefficient of reflectivity of a black, light-absorbing surface. In the shown embodiment, the specularly reflective surface 40 is oriented to reflect light from a scanner lamp 26 to a scanner sensor 32. The specularly reflective surface 40 may be created by buffing, etching, painting, or applying a reflective substance or coating, or gluing or affixing reflective material to a document-backing surface 34, or by any other known method for creating a reflective surface.

Figure 9:
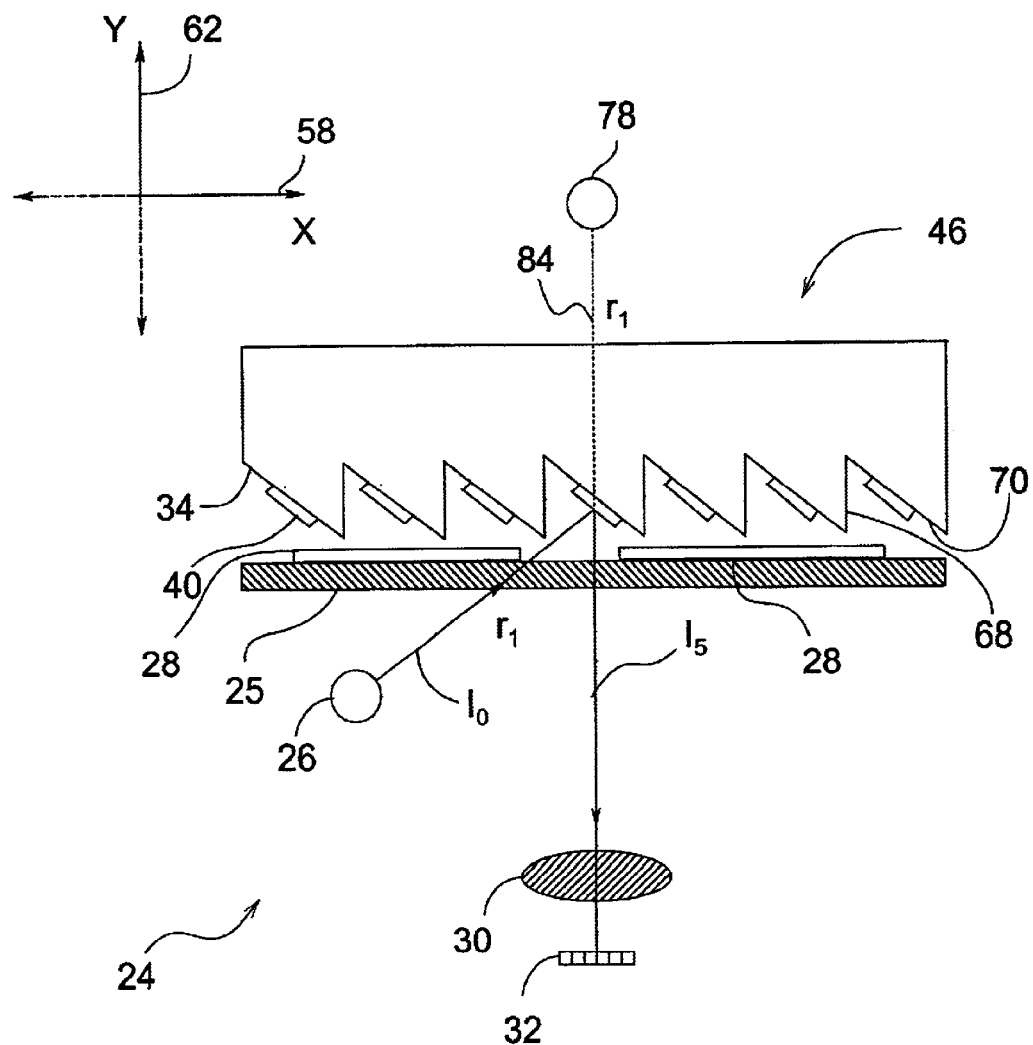
FIG. 9 is a cross-sectional view of one exemplary embodiment of a document-scanner cover with a document-backing surface comprising a plurality of nonreflective tooth surfaces, a specularly reflective surface partially covering at least one of the nonreflective tooth surfaces, and a document with an aperture, illustrating light reflecting off the document-backing surface.
Figure 10:
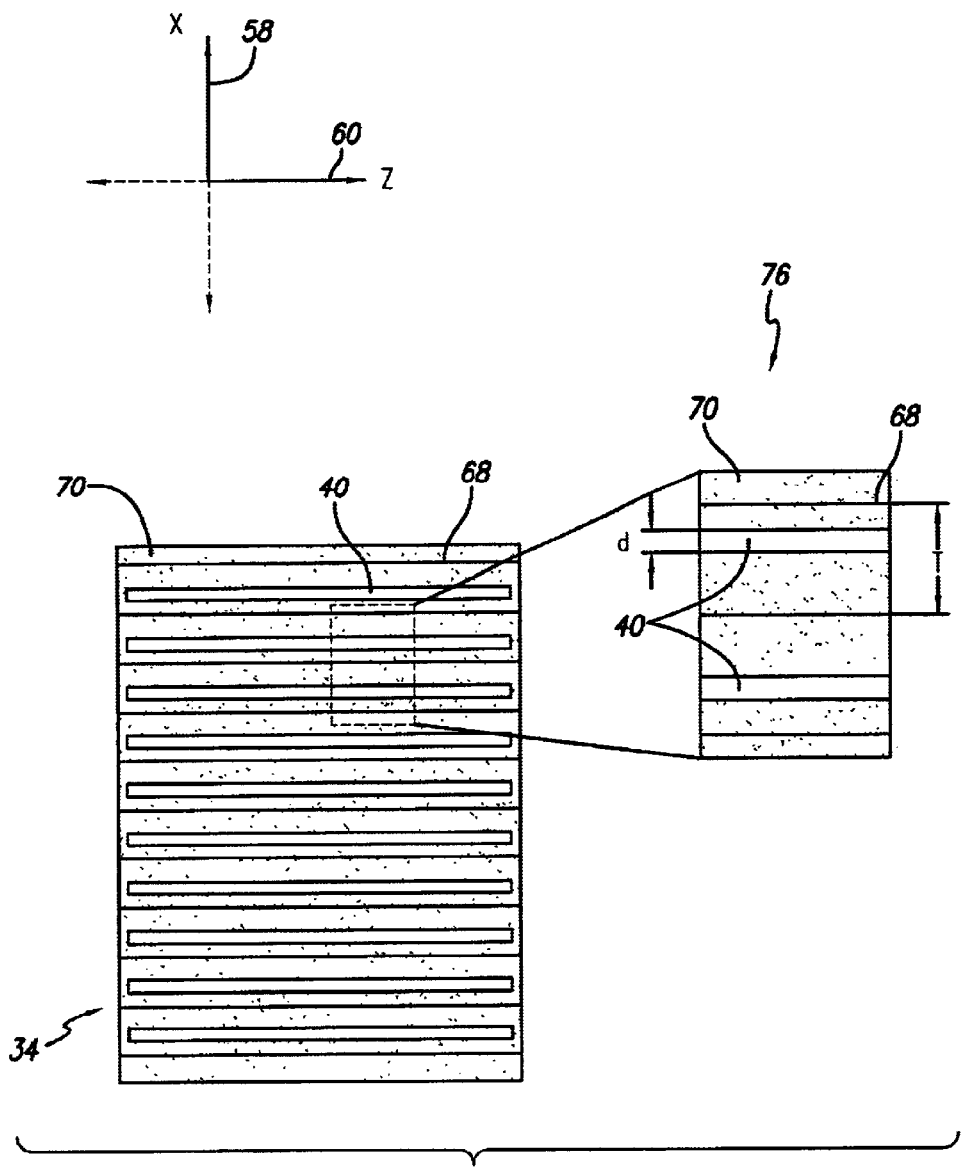
FIG. 10 shows one exemplary embodiment of a document-backing surface with a plurality of nonreflective tooth surfaces, a plurality of specularly reflective surfaces partially covering the nonreflective tooth surfaces, and an enlarged view of a section of the shown document-backing surface.
Figure 11:
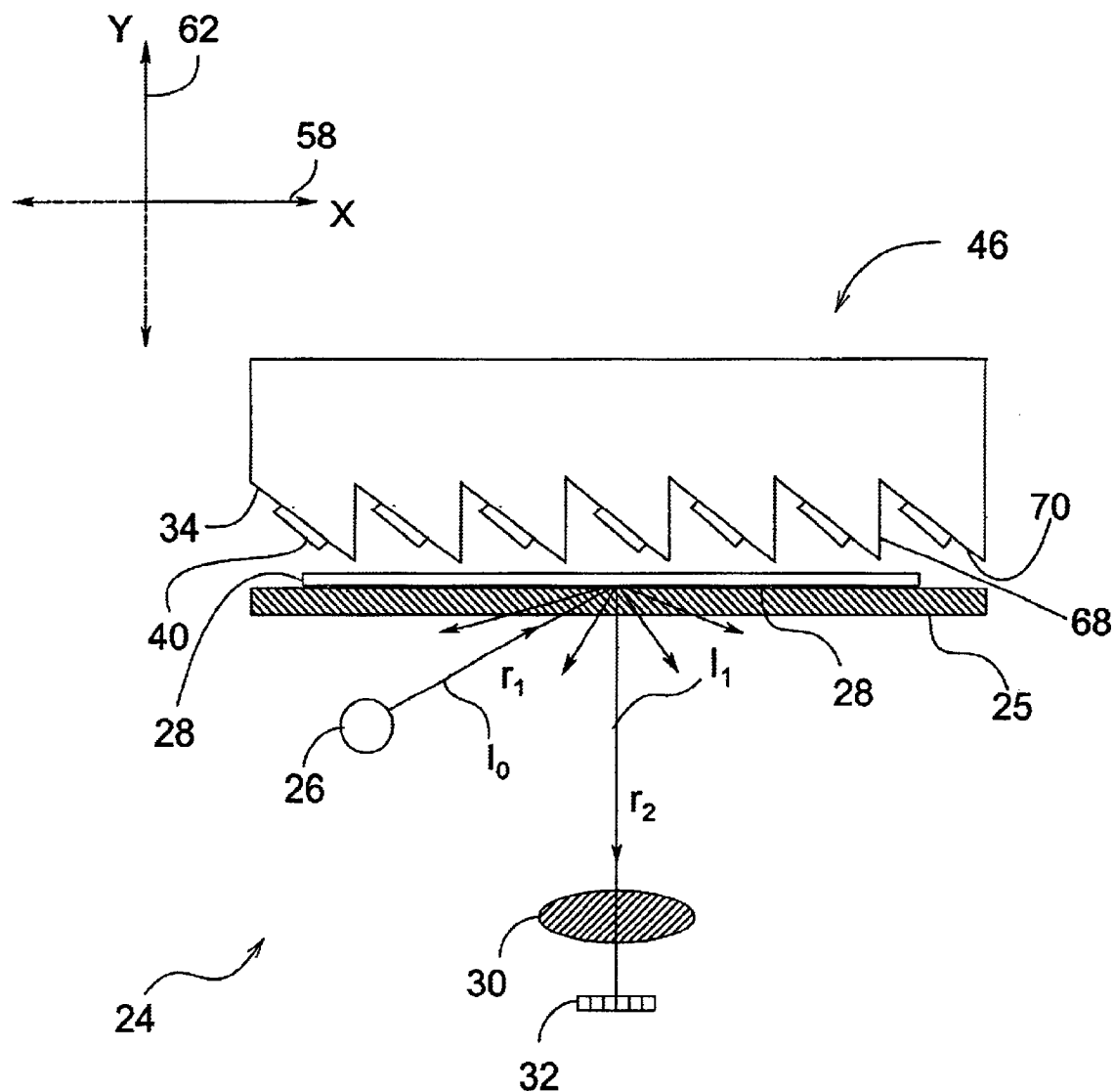
FIG. 11 is a cross-sectional view of one exemplary embodiment of a document-scanner cover with a plurality of nonreflective tooth surfaces, a specularly reflective surface partially covering at least one of the nonreflective tooth surfaces, and a document, illustrating light reflecting off a document.

As shown in cross-section in FIG. 9, an additional preferred embodiment of the document-backing surface 34 includes both a plurality of first and second tooth surfaces 68, 70 in a plurality of shapes, sizes, and orientations and a plurality of specularly reflective surfaces 40 partially covering the second tooth surfaces 70. In this preferred embodiment, specularly reflective surfaces 40 are oriented to reflect light from a scanner lamp 26 to a scanner sensor 32. Preferably, first tooth surfaces 68 and second tooth surfaces 70 are light-absorbing. In addition, specularly reflective surfaces 40 specularly reflect incident light rays $I_O$ creating specularly reflected light ray $I_5$. FIG. 10 shows a facing view of the preferred embodiment of the document-backing surface 34 shown in FIG. 9. In addition, FIG. 10 shows an enlarged view 76 of a small section of the document-backing surface 34. In the enlarged view 76, "d" represents the width of specularly reflective surface 40 (also referred to herein as the "mirror width") and "T" represents the distance between adjacent first tooth surfaces 68 (also referred to herein as the "sawtooth period"). FIG. 11 shows another cross-sectional view of the preferred embodiment of the document-backing surface shown in FIG. 9. FIG. 11 shows incident light rays $1_o$ being diffusely reflected off a white-paper document 28, whereas FIG. 9 shows incident light rays $1_o$ being specularly reflected off specularly reflective surface 40.

In operation, the present invention takes advantage of the fact that specular reflection (FIG. 9) is substantially more intense than diffuse reflection (FIG. 11). As shown in FIG. 9, incident light rays $1_o$ are specularly reflected off specularly reflective surface 40 onto the scanner lens 30 when a hole, tear, or edge of a document 28 is encountered during scanning. Because specularly reflected light ray ($I_5$) is more intense than the light that is diffusely reflected from a white-paper document 28 during normal scanning, only a fraction of the specularly reflected light is needed to achieve the equivalent reflectance of a white-paper document 28. One way to achieve the equivalent reflectance of a white-paper document 28 is to reduce the area of specularly reflective surface 40. The rest of the scanner cover (first tooth surface 68 and second tooth surface 70) is preferably made black to reduce the overall reflection.

Figure 3:
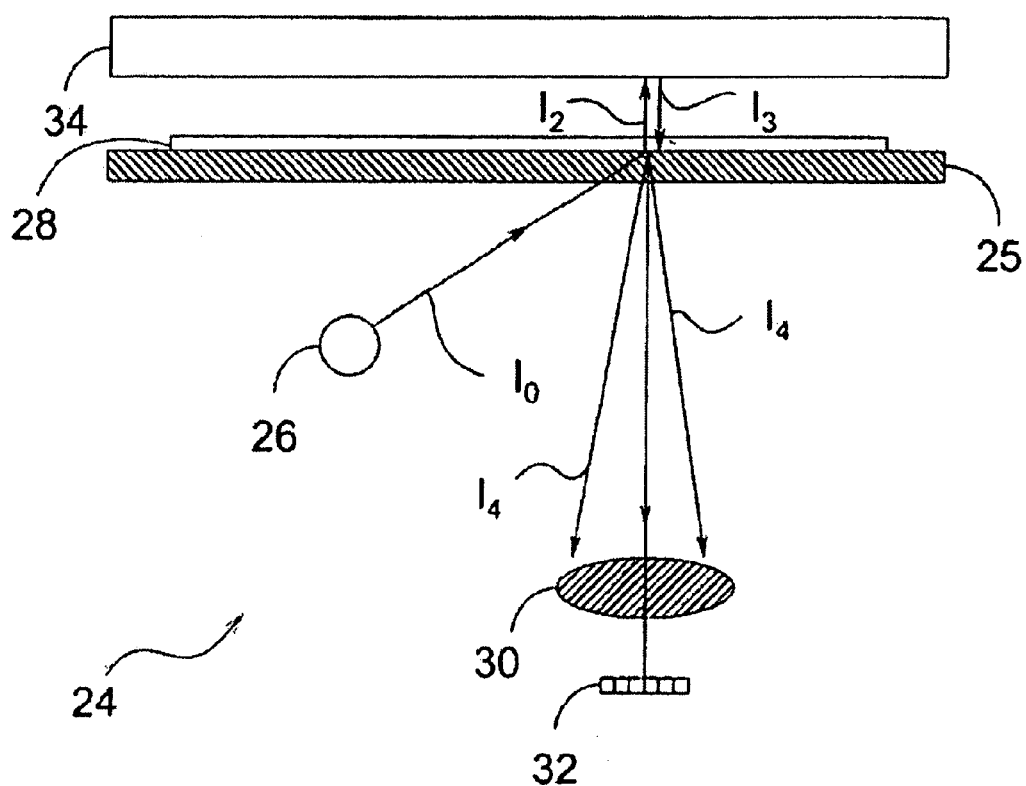
FIG. 3 is a cross-sectional view of a document-scanning system illustrating light being reflected off a document-backing surface and through a document without back-side printing.
Figure 4:
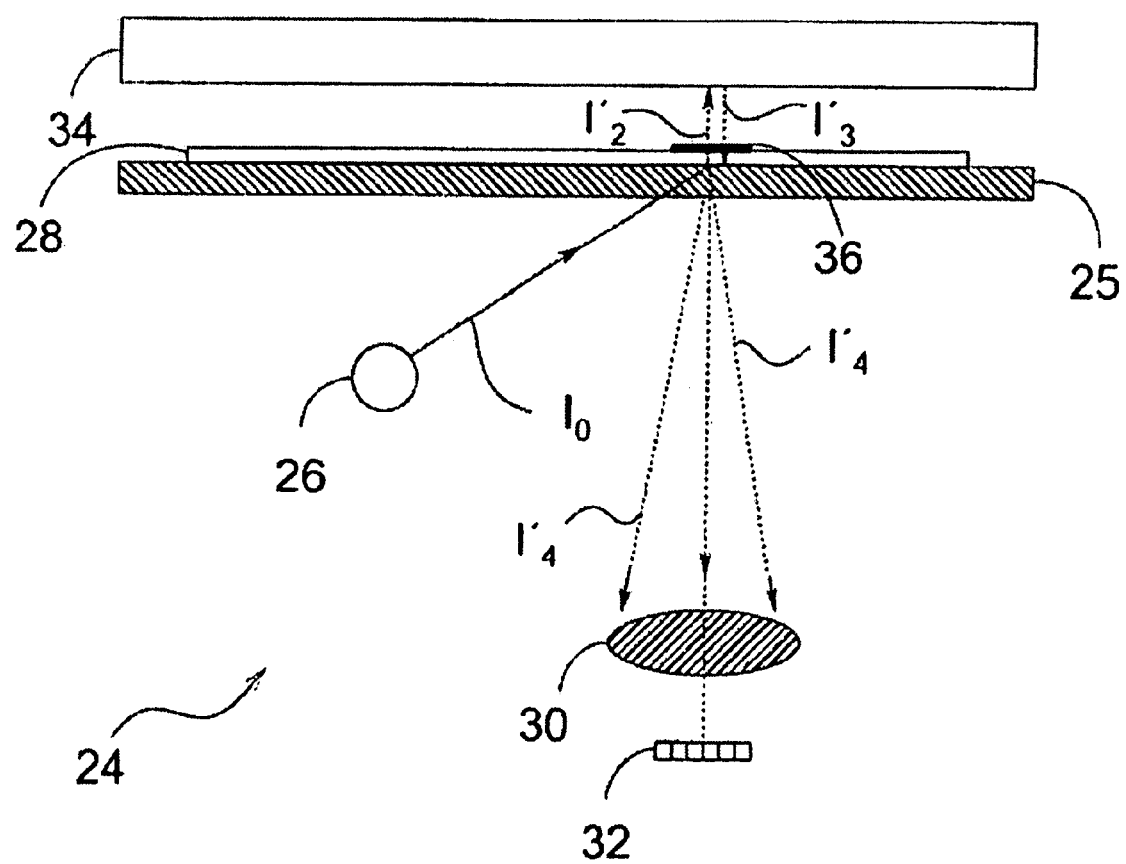
FIG. 4 is a cross-sectional view of a document-scanning system illustrating light being reflected off a document-backing surface and through a document with back-side printing.
Figure 5:
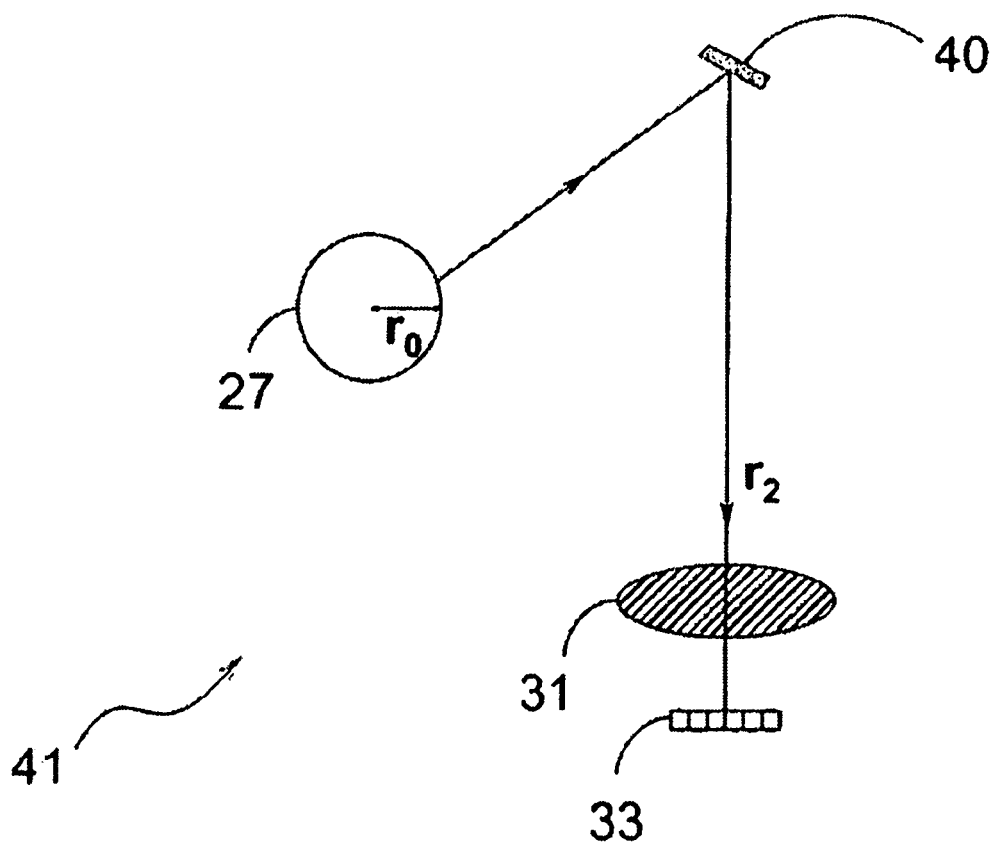
FIG. 5 is a cross-sectional view of an exemplary configuration illustrating light being reflected off a specularly reflective surface.
Figure 6:
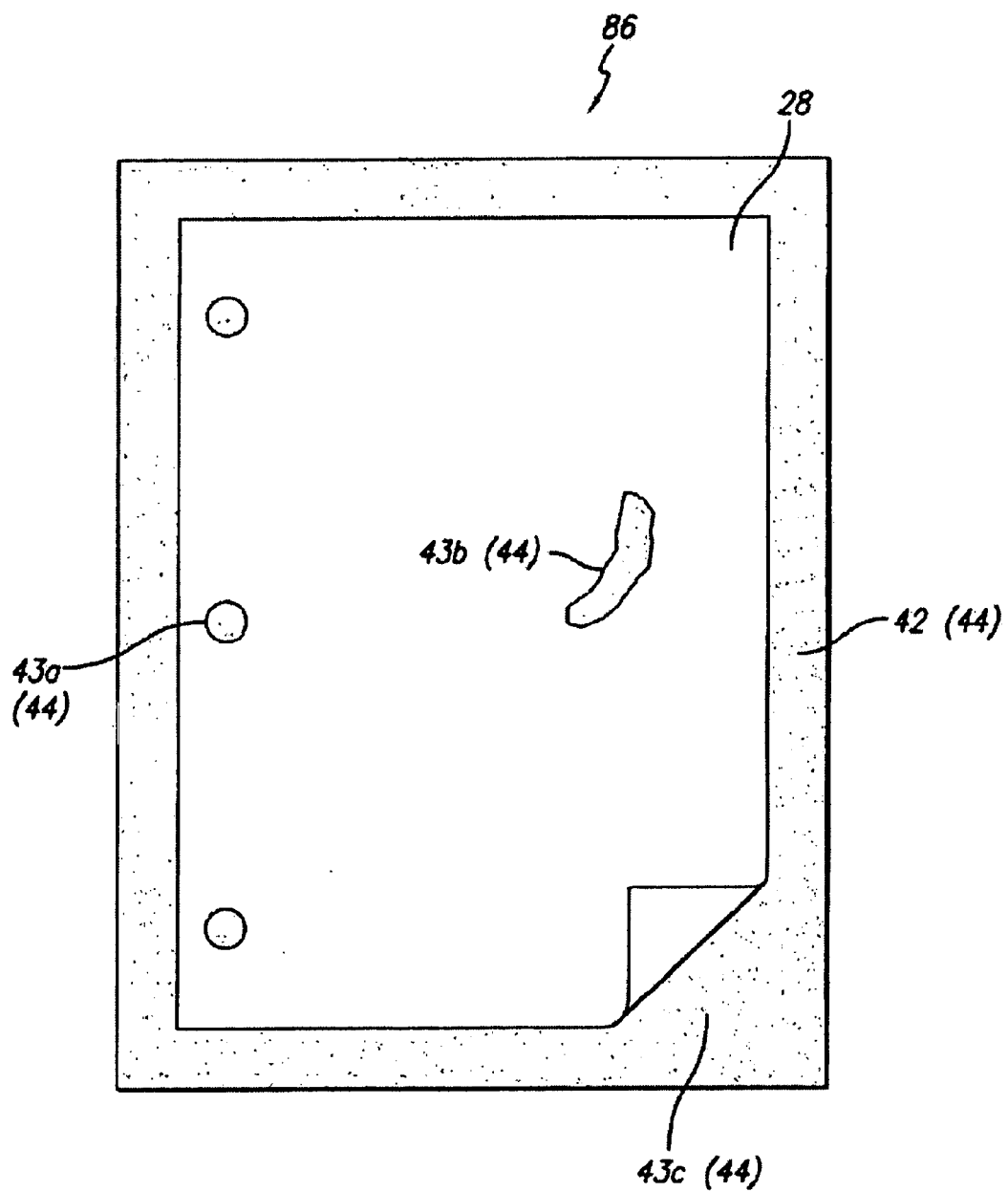
FIG. 6 is a front view of a scanned image of a document with holes, tears, and dog-ears and which is smaller than the defined area to be scanned.

In contrast, as shown in FIG. 11, incident light rays $I_0$ are diffusely reflected when a white-paper document 28 is scanned. For the most part, the scanner lens sees only the diffusely reflected first reflected light ray $I_1$ shown in FIG. 11. It will be remembered, however, that the scanner lens 30 also sees second-transmitted light ray $I_4$ (not shown in FIG. 11, but shown in FIG. 3). The intensity of second-transmitted light ray $I_4$, however, is significantly lower with the document-backing surface 34 of the present invention than it was with the white document-backing surface 34 example in the Background of the Invention. When first-transmitted light ray $I_2$ (FIG. 3) impinges on the document-backing surface 34, much of first-transmitted light ray $I_2$ will be absorbed (because first and second tooth surfaces 68 and 70 are black). Only the fraction of first-transmitted light ray $I_2$ incident on specularly reflective surface 40 will be reflected. But specularly reflective surface 40 is relatively small, so only a fraction of first-transmitted light ray $I_2$ will be reflected. This means that the intensity of second-transmitted light ray $I_4$ will be relatively low. In other words, the equivalent reflectance of the document-backing surface 34 shown in FIG. 11 is small, i.e., the document-backing surface 34 appears almost black to the scanner sensor 32. As a result, show-through is greatly reduced or eliminated.

In one exemplary embodiment, the overall reflection can be cut by 75% if the mirror width (d) is one-quarter of the sawtooth period (T). This reduces the show-through effect by a factor of 4. The difference in digital count between areas with 20 and without 22 back-side printing drops to only 4. A difference in digital count of 4 is an acceptable amount of show-through for most copiers. In contrast, in the example discussed in the Background of the Invention, with reference to FIG. 1, the difference in digital count is 15.

In an alternative preferred embodiment, to reduce the amount of specularly reflected light, the coefficient of reflectivity of specularly reflective surface 40 is reduced. In yet another exemplary embodiment, both the coefficient of reflectivity and the area of specularly reflective surface 40 are reduced.

While the plurality of specularly reflective surfaces 40 may be oriented as parallel strips as shown in FIGS. 9 and 10, other shapes and orientations are contemplated: specularly reflective surfaces 40 may be round, square, rectangular, convex, concave, or flat. The important point is that each specularly reflective surface 40 at least partially covers a nonreflective second tooth surface 70, and the respective reflective and nonreflective surfaces together determine the coefficient of reflectivity for the document-backing surface 34 as a whole. In an alternative embodiment, the desired coefficient of reflectivity for the document-backing surface 34 may be achieved by partially covering a specularly reflective surface 40 with a nonreflective surface.

In embodiments in which the document-backing surface 34 includes both a plurality of surfaces in a plurality of shapes, sizes, and orientations and a specularly reflective surface 40 partially covering at least one nonreflective second tooth surface 70, the specularly reflective surface 40 may be created by painting on or otherwise applying a reflective substance or coating, or by gluing or otherwise affixing reflective material to nonreflective second tooth surfaces 70. In addition, nonreflective second tooth surfaces 70 may be entirely coated with a first layer of specularly reflective material, and then with a second layer of nonreflective material. Subsequently, the second layer of nonreflective material may be partially removed through an etching or other process to expose at least one specularly reflective surface 40.

In one exemplary embodiment, it is preferable to hide the pattern of reflective surfaces on the document-backing surface 34. To hide the pattern of the document-backing surface 34, the sawtooth period (T) must be small enough so that the image it reflects onto the scanner sensor 32 is smaller than the resolution limit of the optical system (optical blur plus scanner sensor 32 aperture). For the best results, T can be determined by projecting the scanner sensor 32 onto the document-backing surface 34 so that there is an integral number of sawtooth patterns in the aperture of the scanner sensor 32. One way to accomplish this is to set T to the same size as the aperture of the scanner sensor 32 projected onto the document-backing surface 34. For example, if the scanner sensor 32 size is 10 um, and the scanner optics magnification is 1/10, then T should be 100 um. The ratio of mirror width to sawtooth period (d/T) determines how much light is reflected. A smaller d/T ratio reduces the equivalent reflectance of the document-backing surface 34, thus reducing the show-through effect. The d/T ratio is preferably set so that the specular reflection is the same as the diffuse reflection from a white-paper document 28. For a typical scanner illumination, the d/T ratio is less than 0.1, which yields a document-backing surface 34 with equivalent reflectance of less than 10%. The foregoing dimensions are exemplary, and other dimensions are contemplated.

Figure 13:
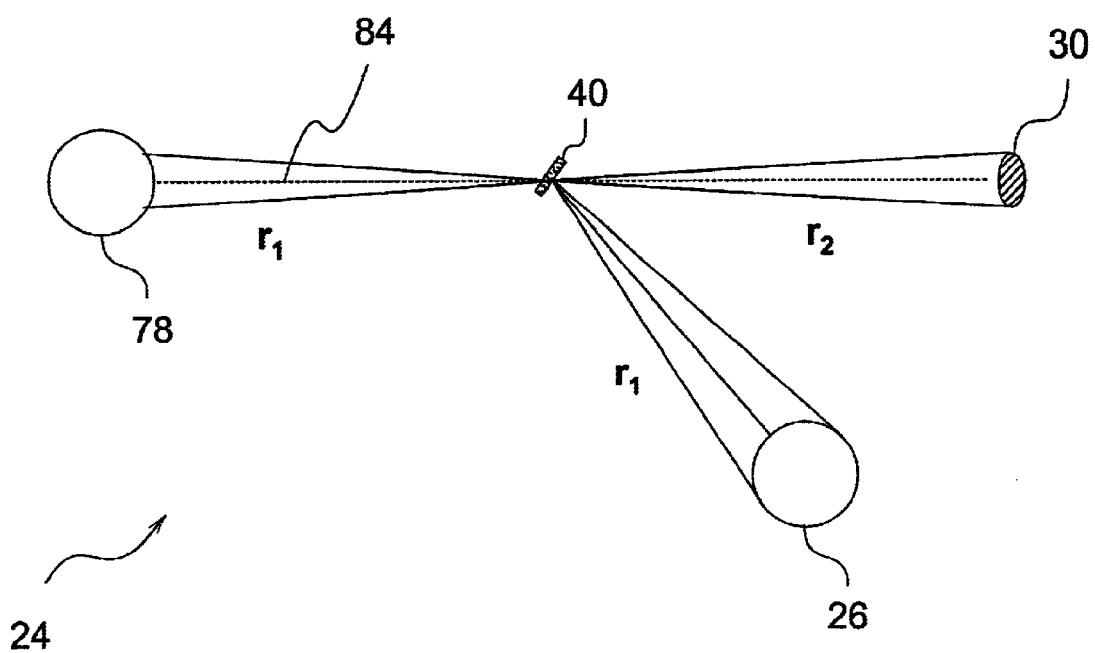
FIG. 13 is a cross-sectional view of the optical path of one exemplary embodiment of a document-scanning system, showing a specularly reflective surface reflecting light onto a scanner lens.

FIG. 13 shows that the virtual lamp 78 fills the aperture of the scanner lens 30. (FIG. 13 illustrates how the specularly reflective surface 40, in one preferred embodiment, images the scanner lamp 26 to the optical axis 84 to form a virtual lamp 78.) Since the specularly reflective surface 40 of the present invention coincides with the field stop of the scanner lens 30, the size of the specularly reflective surface 40 will not affect the irradiance onto the scanner sensor 32. Because the scanner lamp 26 is much larger than the scanner sensor 32 IFOV, the scanner lamp 26 fills the IFOV of the optical system. (Normally, the scanner sensor 32 IFOV is less than 0.05 mm for a 600 DPI document-scanning system, and scanner lamp 26 is greater than 2 mm. This is similar to an integrating sphere case. Although the aperture of the integrating sphere is a virtual surface, it is still considered to be a Lambertian diffuser with the same radiance as the interior surface. As will be recognized by those skilled in the art, the aperture may be treated as if it is a real surface with a Lambertian characteristic, even though light actually comes from the interior of the integrating sphere. Thus, for the scanner sensor 32 the reflective surface appears to have the same radiance as the scanner lamp 26.

Figure 12A:
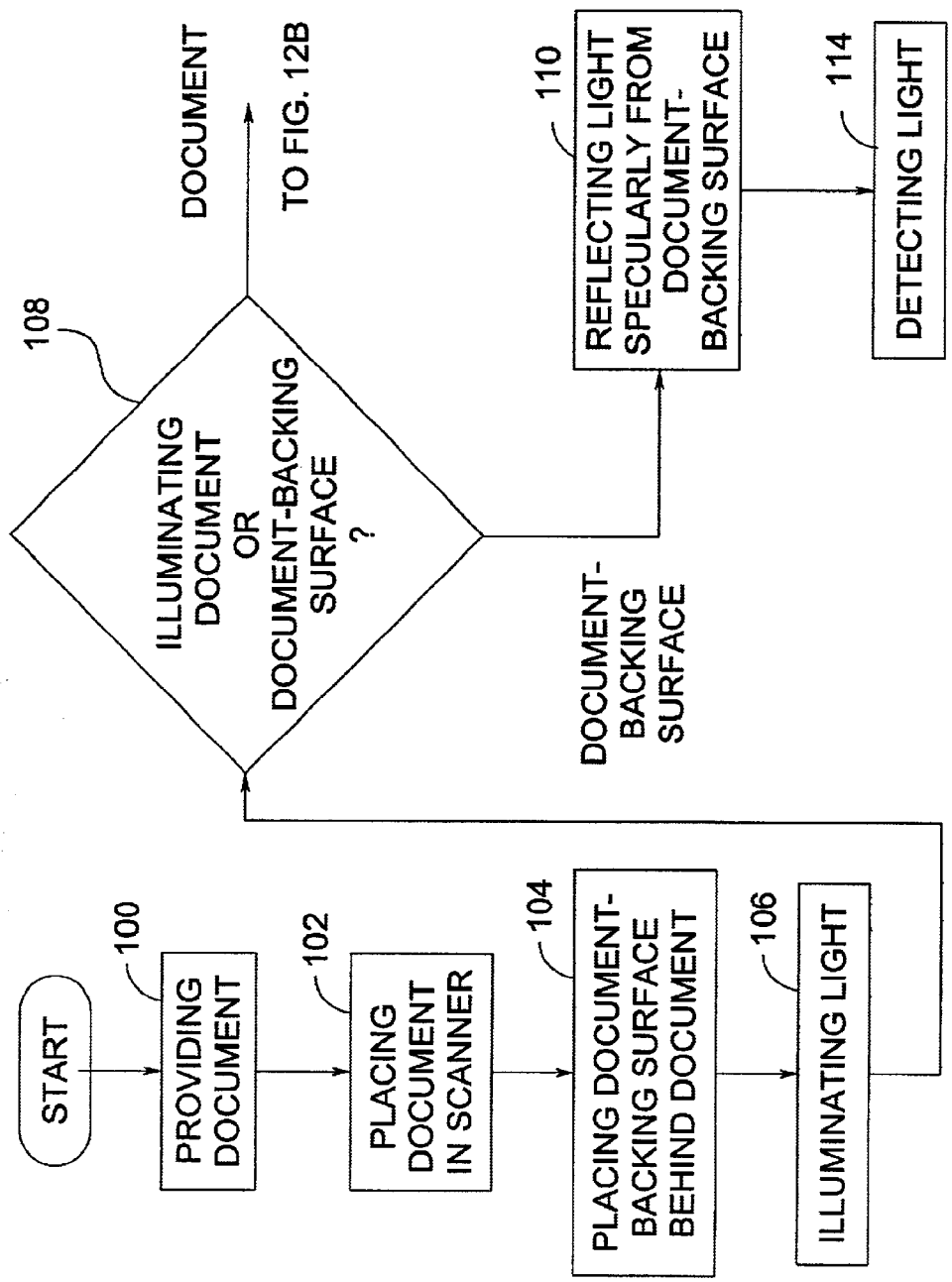
FIGS. 12A and 12B show a flow diagram of an exemplary method of the present invention.
Figure 12B:
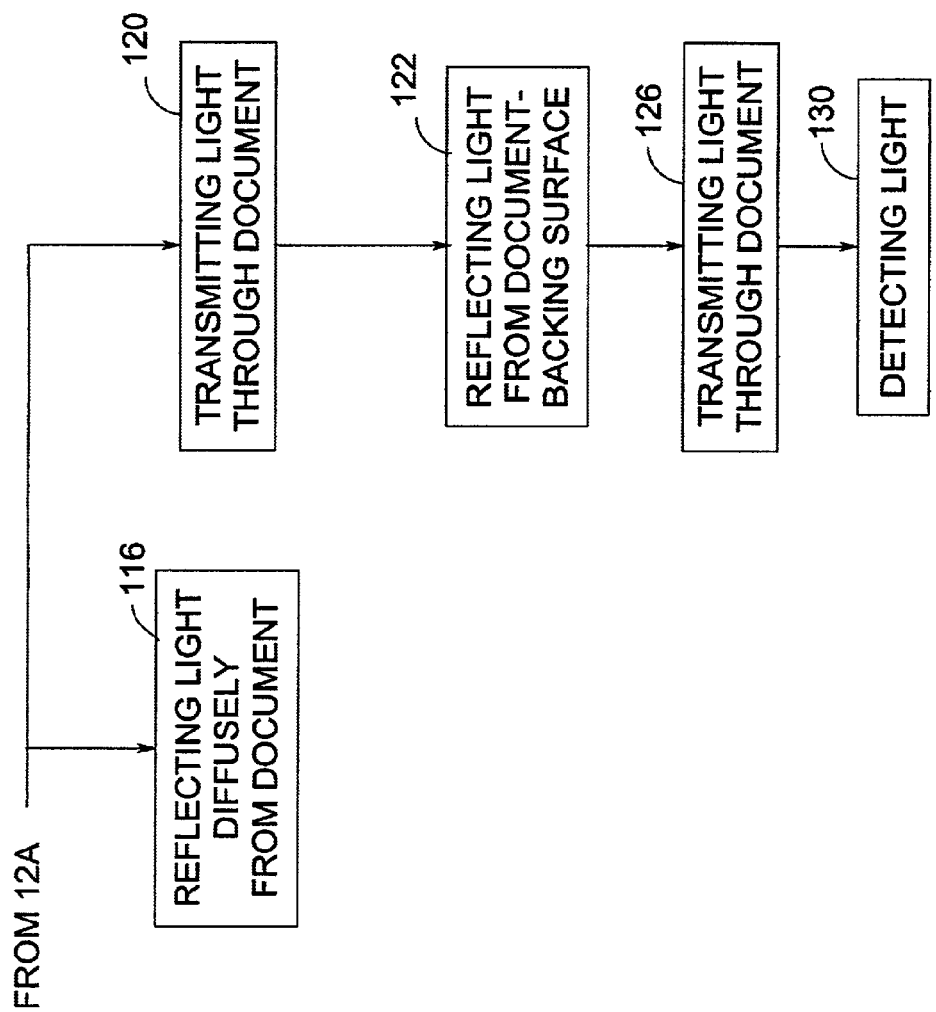

As shown in FIGS. 12A and 12B, one aspect of the present invention is directed to a method for using a document-backing surface 34. In the shown method, a document is provided 100, placed in a document-scanning system 102, and a document-backing surface is placed behind the document 104. Illuminating light 106 impinges either on the document or on the document-backing surface 108. As shown in FIG. 12A, light shone onto the document-backing surface is specularly reflected 110. Light reflected by the document-backing surface is detected 114 by the scanner sensor. Similarly, as shown in FIG. 12B, part of the light shone onto the document is diffusely reflected 116 and part is transmitted through the document 120. Light transmitted through the document impinges on the document-backing surface and is reflected 122. Light reflected by the document-backing surface strikes the back side of the document and is transmitted through the document 126. The transmitted light is detected 130 by the scanner sensor. This method may be repeated for each pixel in a document.

In the Background of the Invention, expressions for radiant flux reflected off a white-paper document 28 ($\Phi_1$) and off a specularly reflective surface 40 (($\Phi_2$) were provided:

$$\Phi_1 = L_1 dA d\Omega = \frac{L_0 R_p \cos(\theta) r_0}{r_1} dA \frac{\pi D^2}{4r_2^2} \quad \text{Equation (4)}$$

$$= \frac{L_0 R_p \cos(\theta) r_0 \pi D^2 dA}{4 r_1 r_2^2}$$

$$\Phi_2 = L_0 dA d\Omega = L_0 R_m dA \frac{\pi D^2}{4r_2^2} = \frac{\pi L_0 R_m D^2 dA}{4r_2^2} \quad \text{Equation (5)}$$

The ratio of $\Phi_2$ to $\Phi_1$ is the gain of the specular reflection over the diffuse reflection. This ratio determines the reduction of show-through in the present invention:

$$\frac{\Phi_2}{\Phi_1} = \frac{\frac{\pi L_0 R_m D^2 dA_2}{4r_2^2}}{\frac{\pi L_0 R_p \cos(\theta) r_0 D^2 dA_1}{4 r_1 r_2^2}} = \frac{R_m r_1}{R_p r_0 \cos(\theta)} \quad \text{Equation (6)}$$

In order to prevent black holes and a black border when scanning, $\Phi_2$ should be the same as or greater than $\Phi_1$ for a white-paper document 28, i.e.:

$$R_m = \frac{r_0 R_p}{r_1} \cos(\theta) \qquad \text{Equation (7)}$$

Since both $R_p$ and $\cos(\theta)$ are less than 1, and $r_1$ is much larger than $r_0$, the coefficient of reflectivity $R_m$ of specularly reflective surface 40 should be set to a value smaller than 1 (100 percent) so that the scanner output is the same as the scanner output when scanning a white-paper document 28 with a reflectance $R_p$. Alternatively, instead of reducing the coefficient of reflectivity $R_m$ of the specularly reflective surface 40, the area of specularly reflective surface 40 may be reduced as shown in FIGS. 9–11. In the shown embodiment, $R_m$ in Equation (7) is replaced with $(d/T)R_m$ and:

$$\frac{d}{T} = \frac{R_p \cos(\theta) r_0}{R_m r_1}. \qquad \text{Equation (8)}$$

If it is assumed that $\theta=45$ degrees, $r_0=1$ mm, $r_1=10$ mm, and $R_p=R_m=1$, then $d/T=0.07$. Under these assumptions, the document-backing surface 34 has an equivalent reflectance of 7% when scanning a paper document 28, and an equivalent reflectance of 100% when scanning the document-backing surface 34 directly. These exemplary dimensions substantially reduce show-through without causing artifacts. In reality, this estimation may be too conservative, since document 28 will not have a coefficient of reflectivity of unity due to absorption and transmission. Moreover, paper is not a Lambertian surface, i.e., a considerable fraction of flux will be specularly reflected and not collected by the scanner lens 30.

While the present invention has been discussed in terms of black-and-white scanners, it will be readily apparent to one skilled in the art that the present invention is equally applicable to color scanners.

The terms and expressions that have been employed in the foregoing specification are used as terms of description, not of limitation, and are not intended to exclude equivalents of the features shown and described or portions of them. The scope of the invention is defined and limited only by the claims that follow.

What is claimed is:

1. In a document-scanning system having a scanner lamp, a scanner sensor, and a scanner cover, said scanner cover having a document-backing surface, said document-backing surface comprising:
    (a) at least one first nonreflective surface at least partially covering said document-backing surface;
    (b) at least one second nonreflective surface at least partially covering said document-backing surface;
    (c) said at least one first nonreflective surface for absorbing light;
    (d) said at least one second nonreflective surface for absorbing light;
    (e) at least one first specularly reflective surface at least partially covering said at least one second nonreflective surface; and
    (f) said at least one first specularly reflective surface for reflecting light.

2. The document-backing surface of claim 1, wherein said at least one first specularly reflective surface is oriented to reflect light from said scanner lamp to said scanner sensor.

3. The document-backing surface of claim 1, wherein said at least one first nonreflective surface is at an angle to said at least one second nonreflective surface.

4. The document-backing surface of claim 1, wherein said at least one first nonreflective surface is a plurality of first nonreflective surfaces.

5. The document-backing surface of claim 4, wherein each of said plurality of first nonreflective surfaces is parallel to each other.

6. The document-backing surface of claim 1, wherein said at least one second nonreflective surface is a plurality of second nonreflective surfaces.

7. The document-backing surface of claim 6, wherein each of said plurality of second nonreflective surfaces is parallel to each other.

8. The document-backing surface of claim 6, wherein each of said plurality of second nonreflective surfaces is at least partially covered by one of said first specularly reflective surfaces.

9. The document-backing surface of claim 1, further comprising at least one second specularly reflective surface at least partially covering said at least one first nonreflective surface, said at least one second specularly reflective surface for specularly reflecting light.

10. The document-backing surface of claim 1, wherein said at least one first nonreflective surface is in a planar relationship to said at least one second nonreflective surface.

11. The document-backing surface of claim 1, wherein said at least one first nonreflective surface is perpendicular to a cover geometric plane.

12. The document-backing surface of claim 1, wherein said at least one second nonreflective surface is in a plane parallel to said a cover geometric plane.

13. The document-backing surface of claim 1, wherein said at least one second nonreflective surface is at an angle to a cover geometric plane.

14. In a document-scanning system having a scanner lamp and a scanner sensor, a document-backing surface for absorbing light, said document-backing surface comprising:
    (a) at least one specularly reflective surface;
    (b) said at least one specularly reflective surface at least partially covering said document-backing surface;
    (c) said at least one specularly reflective surface oriented to reflect light from said scanner lamp to said scanner sensor;
    (d) wherein said at least one specularly reflective surface is a plurality of specularly reflective surfaces; and
    (e) wherein each of said plurality of specularly reflective surfaces has a coefficient of reflectivity, each said coefficient of reflectivity being less than 100 percent.

15. In a document-scanning system having a scanner lamp and a scanner sensor, a document-backing surface for absorbing light, said document-backing surface comprising:
    (a) at least one specularly reflective surface;
    (b) said at least one specularly reflective surface at least partially covering said document-backing surface;
    (c) said at least one specularly reflective surface oriented to reflect light from said scanner lamp to said scanner sensor;
    (d) wherein said at least one specularly reflective surface is a plurality of specularly reflective surfaces; and
    (e) wherein each of said plurality of specularly reflective surfaces has a coefficient of reflectivity $R_m$, each said coefficient of reflectivity $R_m$ being such that the expression $R_m \geq [r_o * R_p * \cos(\theta)] - 1/r_1$ is true,
    where $r_0$ denotes the radius of the scanner lamp, $r_1$ denotes the distance from the scanner lamp to a pixel scanned, and $R_p$ denotes the reflectance of a paper document.

16. In a document-scanning system having a scanner lamp, a scanner sensor, and a scanner cover, said scanner cover having a document-backing surface, said document-backing surface comprising:
   (a) at least one first nonreflective surface at least partially covering said document-backing surface;
   (b) at least one second nonreflective surface at least partially covering said document-backing surface;
   (c) said at least one first nonreflective surface for absorbing light;
   (d) said at least one second nonreflective surface for absorbing light; and
   (e) at least one first specularly reflective surface at least partially covering said at least one second nonreflective surface.

17. The document-backing surface of claim 16, wherein said at least one first specularly reflective surface is for specularly reflecting light.

18. In a document-scanning system having a document-scanning cover, said document-scanning cover having a first cover end, a second cover end opposite said first cover end, a first cover side, a second cover side opposite said first cover side, a document-backing surface against which a document is placed for scanning, an opposite surface opposite said document-backing surface, a longitudinal cover axis extending between said first cover end and said second cover end, a latitudinal cover axis extending between said first cover side and said second cover side, a cover geometric plane defined by said longitudinal axis and said latitudinal axis, and a thickness defined between said document-backing surface and said opposite surface, said document-backing surface comprising:
   (a) at least one tooth;
   (b) each said at least one tooth having a first tooth surface and a second tooth surface;
   (c) each said first tooth surface being perpendicular to said cover geometric plane;
   (d) each said second tooth surface at an angle to said cover geometric plane; and
   (e) each said at least one tooth having a first tooth side and a second tooth side.

19. The document-backing surface of claim 18, wherein each said first tooth surface is light-absorptive.

20. The document-backing surface of claim 18, wherein each said second tooth surface is light-absorptive.

21. The document-backing surface of claim 20, further comprising at least one first specularly reflective surface at least partially covering said second tooth surface, said at least one first specularly reflective surface being specularly light-reflective.

22. The document-backing surface of claim 20, further comprising at least one mirror at least partially covering each said second tooth surface.

23. The document-backing surface of claim 18, wherein each said second tooth surface extends between the top of one first tooth surface and the bottom of an adjacent first tooth surface.

24. The document-backing surface of claim 18, wherein said first cover end and said second cover end are parallel.

25. The document-backing surface of claim 18, wherein said first cover side and said second cover side are parallel.

26. The document-backing surface of claim 18, wherein each said first tooth side is perpendicular to said longitudinal axis and perpendicular to said latitudinal axis.

27. The document-backing surface of claim 18, wherein each said second tooth side is perpendicular to said longitudinal axis and perpendicular to said latitudinal axis.

* * * * *

UNITED STATES PATENT AND TRADEMARK OFFICE
CERTIFICATE OF CORRECTION

PATENT NO. : 6,952,293 B2
DATED : October 4, 2005
INVENTOR(S) : Xiao-fan Feng

It is certified that error appears in the above-identified patent and that said Letters Patent is hereby corrected as shown below:

Column 7,
Line 38, "nonpilanar" should read -- nonplanar --.

Column 8,
Lines 19, 21 and 26, "$1_o$" should read -- $I_0$ --.

Column 10,
Line 42, "(($\Phi_2$)" should read -- ($\Phi_2$) --.

Column 12,
Line 62, "$R_m \geq [r_o*R_p*\cos(\theta)]-1/r_1$" should read -- $R_m \geq [r_0*R_p*\cos(\theta)]-1/r_1$ --.

Signed and Sealed this

Twenty-eighth Day of February, 2006

JON W. DUDAS
*Director of the United States Patent and Trademark Office*